United States Patent [19]

Morrison

[11] Patent Number: 4,519,001

[45] Date of Patent: May 21, 1985

[54] APPARATUS FOR PROVIDING DROPOUT COMPENSATION AND ERROR CONCEALMENT IN A PAL FORMAT VIDEO INFORMATION SIGNAL

[75] Inventor: Eric F. Morrison, Redwood City, Calif.

[73] Assignee: Ampex Corporation, Redwood City, Calif.

[21] Appl. No.: 315,578

[22] Filed: Oct. 27, 1981

[51] Int. Cl.³ .......................................... H04N 9/491
[52] U.S. Cl. ................................... 358/310; 358/328
[58] Field of Search ............... 358/310, 314, 320, 324, 358/328

[56] References Cited

U.S. PATENT DOCUMENTS 4,122,487 10/1978 Beaulier et al. ...................... 358/13
4,301,466 11/1981 Lemoine et al. ................... 358/310
4,376,955 3/1983 Reitmeier ........................... 358/314

FOREIGN PATENT DOCUMENTS 1456501 11/1976 United Kingdom .
2066617 7/1981 United Kingdom .

OTHER PUBLICATIONS

Weston, M., "A PAL/YUV Digital System for 625--Line International Connections", E.B.U. Review, Jun. 1967, pp. 137-148.
Heitmann, J., "Digitalisierung . . . Studiosignale", Furnaeh and Kino-technik, vol. 5, 1979, pp. 150-154.
Hausdorfer, M., "Digitale . . . Fernsehstudio", Fernseh and Kinotechnische Gesellschaft e. V. Tagunsband, Manuscripts of the lectures given on the 7th annual meeting of the FKTG of Sep. 17-21, 1979, pp. 66-75.

Primary Examiner—Richard Murray
Attorney, Agent, or Firm—Ralph L. Mossino; William A. Marvin; Joel D. Talcott

[57] ABSTRACT

Apparatus is disclosed for providing error compensation of a video information signal having a PAL format. Sampling of the analog PAL format video information signal is done at a rate of four times the chrominance subcarrier frequency and is done in a precise manner whereby the samples are taken along orthogonal vector axes that are oriented at 45° relative to the U and V vector axis. When samples are taken at the prescribed locations, substitute samples in the form of multi-bit digital words can be used as replacements for defective or missing sample words, which replacement samples exhibit the same vector phase as the defective sample, but which are taken from either the preceding or succeeding line relative to the line in which the defective sample is located. The apparatus of the present invention obviates the necessity of performing any arithmetic computation to derive the value for the sample to be substituted. Moreover, the sample is spatially closely related to the defective sample, i.e., it is merely spatially removed one horizontal line from the line of interest and is vertically aligned relative to the defective sample. The detection of a defective sample activates the apparatus to automatically substitute the proper digital data word sample for the defective sample. If part of or an entire line is missing or defective, the system automatically inserts an average of the preceding and succeeding line during the period of time when the missing or defective information is detected.

7 Claims, 7 Drawing Figures

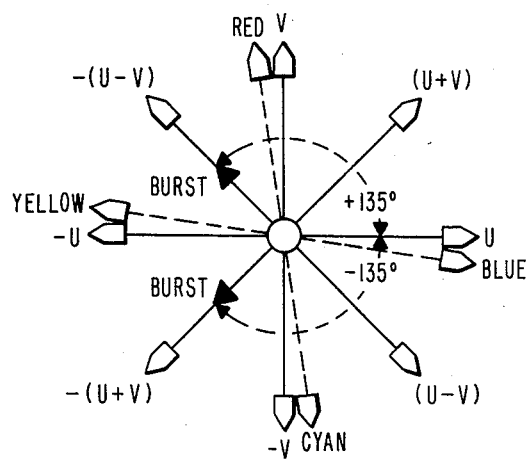
FIG_1
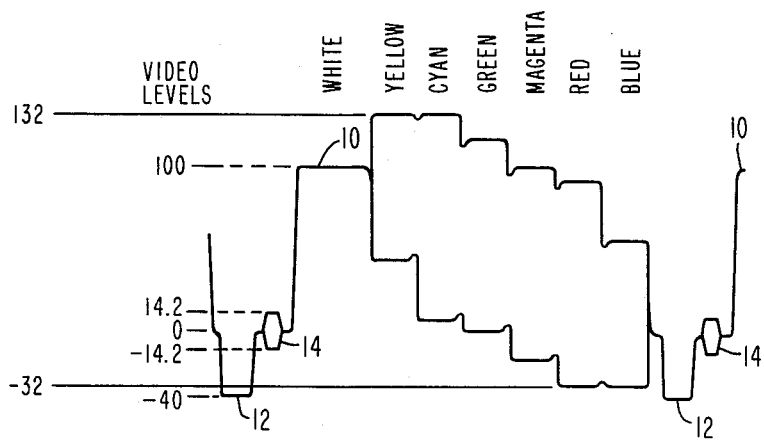
FIG_2
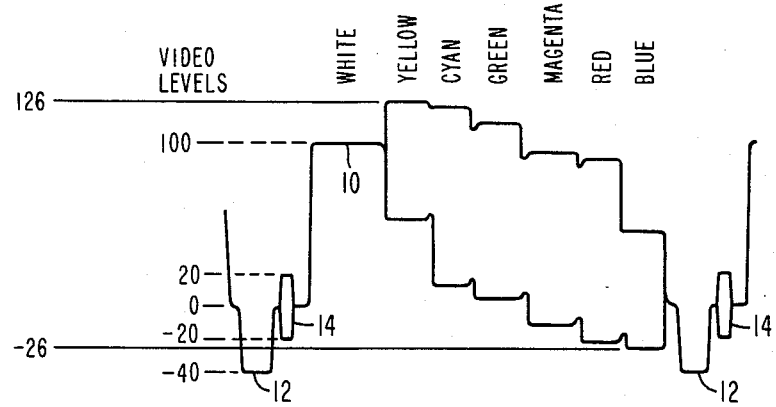
FIG_3

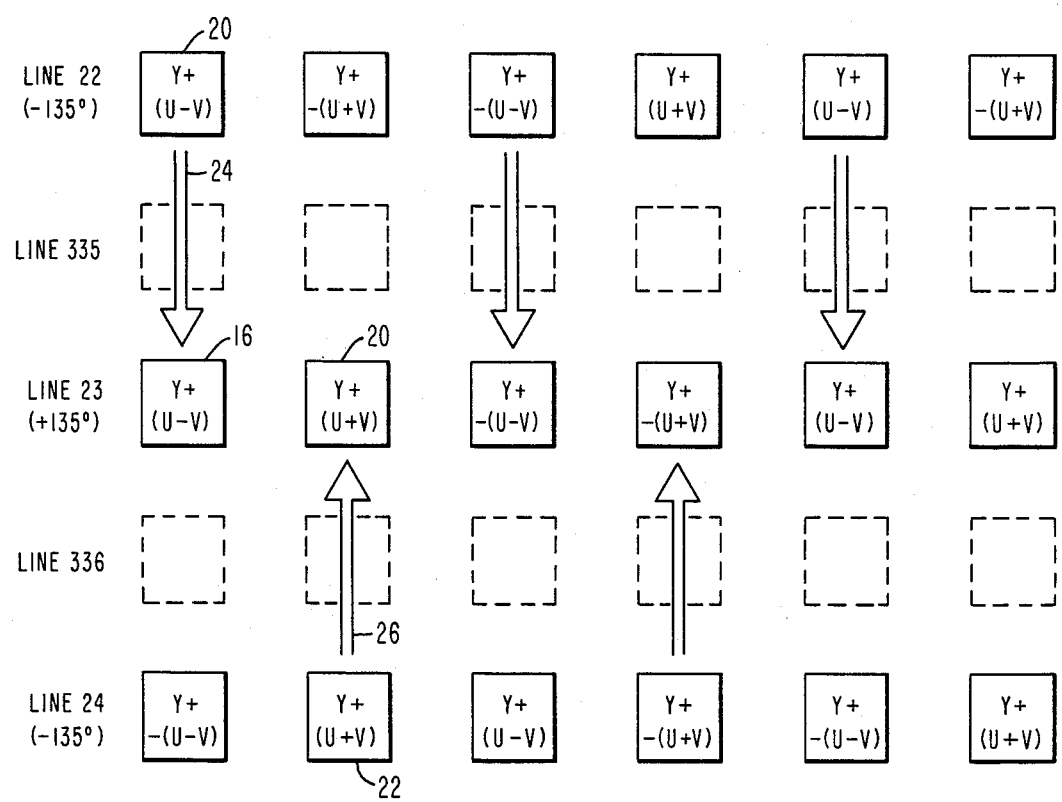
FIG_4
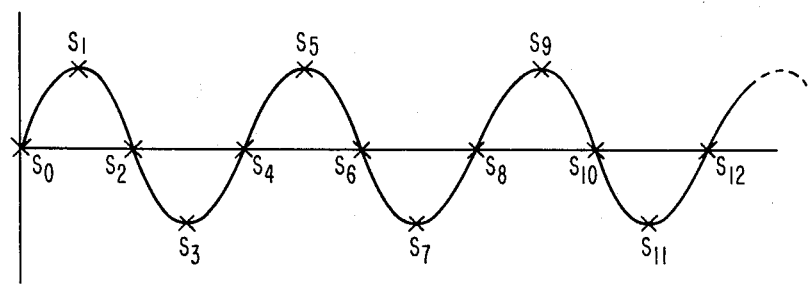
FIG_6

APPARATUS FOR PROVIDING DROPOUT COMPENSATION AND ERROR CONCEALMENT IN A PAL FORMAT VIDEO INFORMATION SIGNAL

BACKGROUND OF THE INVENTION

The present invention generally relates to a system for sampling an analog video information signal having a PAL format and, more particularly, is directed to dropout and/or error concealment of the resulting digital data stream. Specifically, the sampling is accomplished at 45°, 135°, 225° and 315° with respect to the U color difference component of the chrominance.

The present invention is intended for use with a video recording and reproducing apparatus such as a magnetic tape recording and reproducing apparatus, although other types of recording and reproducing apparatus may advantageously incorporate the present invention as will be apparent from the following description. The present invention utilizes apparatus for sampling an analog video information signal with a PAL format at four times the frequency of the subcarrier component of the signal. The resulting digitized samples provide significant advantages in terms of the dynamic range of the sampling system and also increase the phase accuracy and therefore the resulting accuracy of the color information while providing a simple and effective method for error compensation of defective and/or missing data.

Recent research and development has been directed toward digital recorders which do not employ FM recording, but instead record digital words that represent samples which were taken of the analog video information signals. The digital words are recorded and reproduced and subsequently converted back to analog signals. There are significant advantages in recording digital signals as opposed to FM recording, among which reside in the fact that during playback or recording, the video signal is not degraded by head to tape spacing losses, Moire, noise and velocity errors. The digital signals permit error correction to be more accurately achieved using data from preceding and succeeding horizontal video lines for correction of defective or missing data words that result from unsuccessful recovery of the data, often referred to as dropouts, wherein an imperfection in the magnetic tape or other problem results in the loss of the signal for very short intervals during reproducing.

Another inherent advantage of digital video recording and reproducing apparatus is that the sampling of the analog signal can be done at a precise phase relationship and accomplished before recording. Because the phase relationship is set before recording, it will not be changed during playback by the presence of any velocity errors. Velocity errors and the like can not affect the phase relationship once sampling is done. It should be appreciated that the accuracy of the phase relationship is determinative of the resulting accuracy of the color information that is recorded and reproduced. In other words, if the sampling clock which determines the actual phase location of the samples taken during each subcarrier cycle is incorrect, then the resulting errors in the color information will be fixed in the samples taken thereby detrimentally affecting the resulting reproduced color information. While they will not change during reproducing as a result of velocity errors and the like, any error that is inserted during the sampling process will occur during reproducing.

Since the sampling clock controls the phase locations at which the samples are taken, it is extremely important that the phase of the sampling clock be made to accurately follow the analog video information signal. The sampling clock is controlled by the known phase relationship to a signal component which is present in the cycles of burst located on the back porch of a blanking interval subsequent to the horizontal sync pulse of each horizontal line. Since the sampling clock is used to sample the burst component of the chrominance subcarrier as well as the active video information for each video line, the samples of the burst component can be stored and thereafter examined to determine if any phase error exists between the sampling clock and the burst component. By appropriately choosing the sampling locations of the burst component, the accuracy of the phase synchronization can be increased, and the dynamic range of the sampling system can be effectively increased as well. Additionally, in accordance with the present invention, by judiciously choosing the sampling locations of the bust component, improved error concealment can be achieved. As will be more fully described, the improved error concealment is a direct result of the choice of the sampling phase locations.

Accordingly it is an object of the present invention to provide an improved sampling apparatus which samples a PAL format video information signal at a rate of four times the frequency of the chrominance subcarrier at locations which are oriented at 45° relative to the U and V vector axes of the PAL signal which permits the use of an improved error concealment technique where a substitute digital data word sample can be obtained and substituted for a defective or missing sample without performing any arithmetic computation.

These and other objects will become apparent upon reading the following detailed description, while referring to the attached drawings, in which:

FIG. 1 is a phasor diagram illustrating the various vector components of the chrominance signal, together with the color burst component, of a PAL format television signal;

FIG. 2 is a graph illustrating a PAL information video signal having fully saturated colors and showing peak signal levels that are obtained when the signal is sampled at four times the chrominance subcarrier frequency along the U and V vector axes in accordance with the prior art;

FIG. 3 is a graph illustrating a PAL information video signal having fully saturated colors and showing peak signal levels that are obtained when the signal is sampled at four times the chrominance subcarrier frequency along the (U+V) and (U−V) axes;

Figure 5:
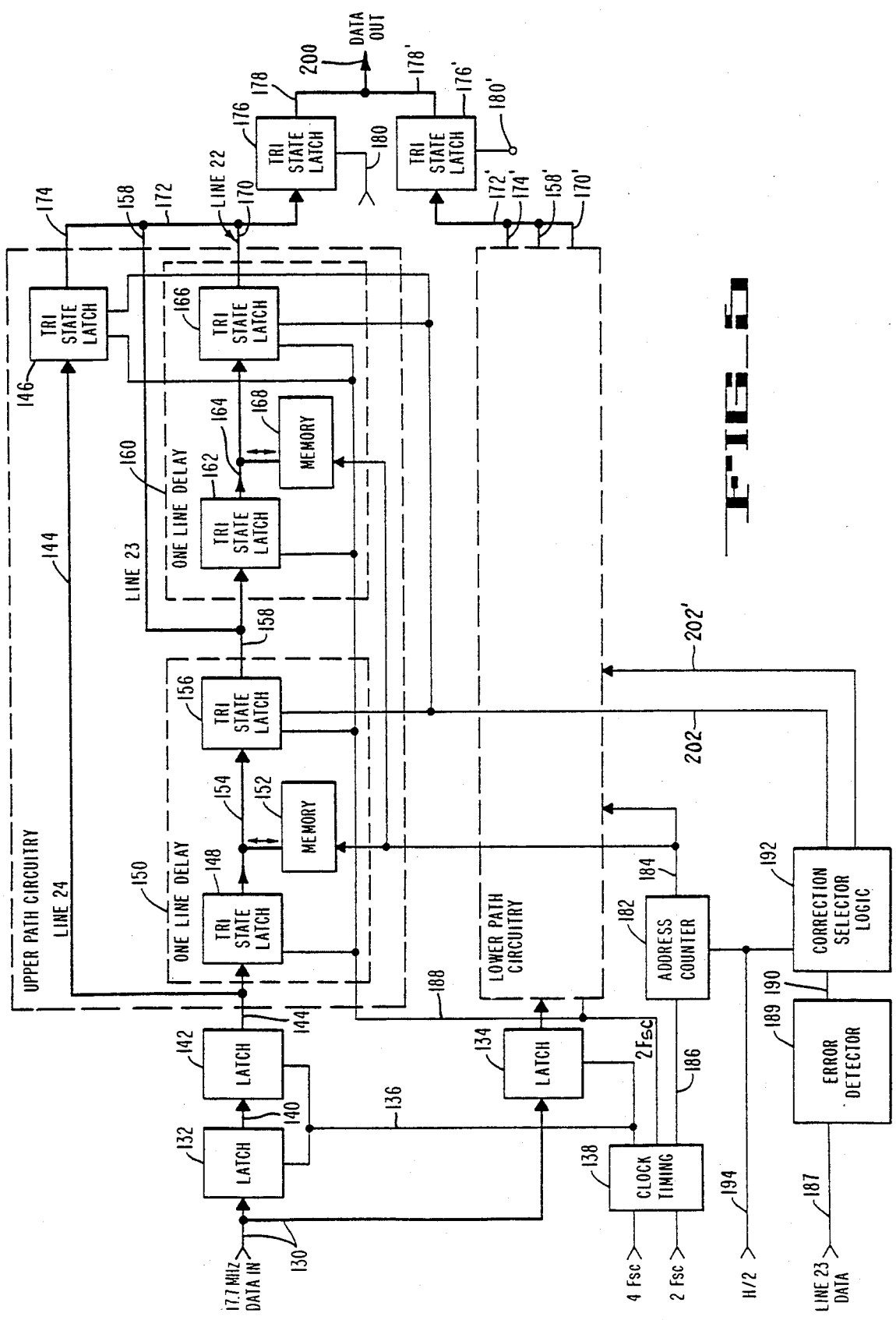
Figure 7:
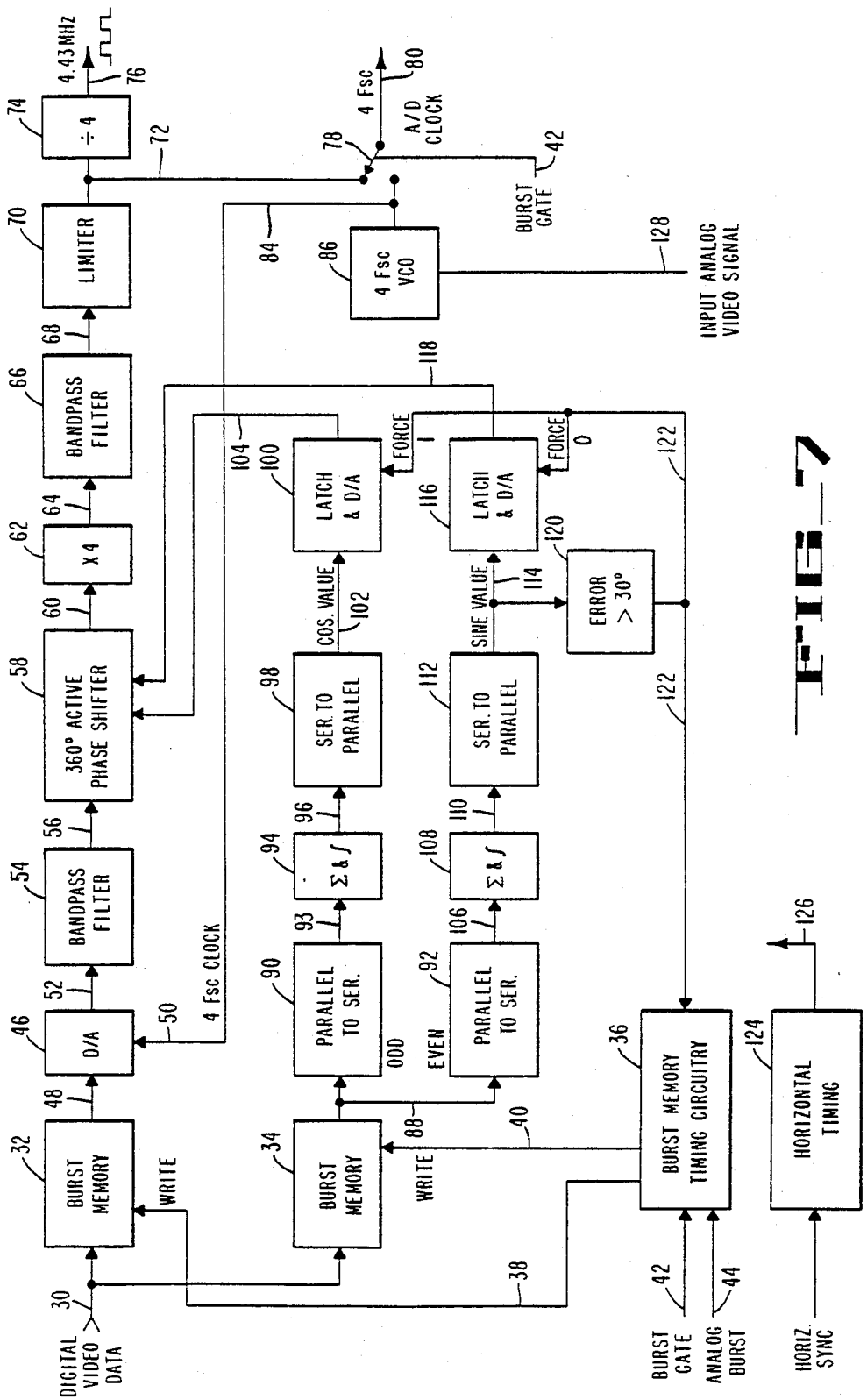

FIG. 4 is a pictorial diagram illustrating consecutive video samples of three consecutive horizontal lines of a PAL television field format signal, namely, lines 22, 23 and 24, with lines 335 and 336 of the alternate field shown in phantom, and highlighting the error concealment technique of the present invention;

FIG. 5 is a functional block diagram of the apparatus particularly embodying the error concealment apparatus of the present invention;

FIG. 6 is a pictorial waveform diagram of the color burst component of a PAL format analog video information signal, illustrating samples taken thereof in accordance with the invention; and, FIG. 7 is a functional block diagram of a portion of the apparatus particularly illustrating the sampling clock phase control portion thereof.

DETAILED DESCRIPTION OF THE APPARATUS

The present invention includes the sampling of a PAL format analog information signal at a precise predetermined frequency and phase relationship which produces a digital data stream of digital word samples which can be recorded on a recording medium such as magnetic tape by a video recording apparatus and which can be reproduced by reproducing apparatus and also converted back to its original form of an analog video information signal. As a result of the method by which the signal is sampled, reliable and efficient error concealment can be accomplished upon reproducing in a manner whereby substitute samples that are spatially close to defective or missing samples can be inserted in the digital data stream. In the preferred implementation the substitute samples are identical with respect to their chrominance vector phase and are spatially close, i.e., they are taken from locations of the immediately preceding or immediately succeeding horizontal line relative to the line in which the defective or missing sample is located. A particular advantage of the error concealment apparatus embodied herein is the fact that the replacement or substitute sample is located immediately adjacent the defective sample, i.e., the substitute sample is vertically aligned with the defective sample and is only one horizontal line displaced from the defective sample and is in the same field of video information as the defective sample. The substitute sample value contains the information from the same phase in the vector representation of the chrominance signal and therefore contains the same color information as the defective sample. In other words, if the defective sample was taken at the (U+V) vector phase, the substitute value is also from that same (U+V) vector phase, but is displaced only one horizontal line from the defective sample and is at the same vertical position along the horizontal line as the defective sample. The result of this is that no arithmetic computation of any type is required in order to obtain the value of the substitute word that is to be inserted in place of the defective or missing sample.

Reference is made to FIG. 1 which is a vector diagram of a signal having the PAL television format. The vector diagram illustrates the phase relationship between the U component (shown as directed toward the right) and the V component (shown as directed upwardly) and its relationship to the color burst representation of the chrominance subcarrier of the PAL format television signal. Although the U component is maintained at a constant phase, the phase relationship of the V component alternates from (+V) to (−V) on every successive horizontal line, i.e., the phase of the V component is reversed every line in the PAL format television signal. Similarly, the phase of the burst which is shown to be either +135° or −135° relative to the U component also alternates between these two positions on successive television lines. The analog video information signal is sampled in accordance with the present invention at a rate of four times the frequency of the chrominance subcarrier which is approximately 4.43 MHz so that the sampling is accomplished at a rate of approximately 17.7 MHz and the digital samples of the analog signal are preferably eight bit data words. The eight bit data word samples comprise a data stream and the data words may be serialized for recording and a parity bit may be added to each data word for the purpose of determining defective or missing data words upon recovery or reproducing of the data. A parity error detector of conventional design may be used to detect defective or missing samples. The particular type of error detector in and of itself is not considered to be a novel aspect of the present invention. Rather, all that is necessary is that defective samples be detected to enable the error concealment aspect of the present invention to be operated. To this end, a parity error detecting apparatus such as is disclosed in the patent application of Lemoine, Serial No. 117,745 and entitled "Parity Checking Circuitry For Use In Multi-Bit cell PCM Recording And Reproducing Apparatus", now U.S. Pat. No. 4,321,704, may be used.

In accordance with an important aspect of the present invention, since the sampling of the PAL signal is done at a sampling frequency of four times the subcarrier frequency, there are four samples for each subcarrier cycle. Referring to the vector diagram, there will be four sample points located thereon which are along the (U+V) axis and along the (U−V) axis which is perpendicular to the (U+V) axis. Therefore, there will be sample points at each of the locations of (U+V), −(U+V), (U−V) and −(U−V). Therefore, the sampling is accomplished at 45°, 135°, 225° and 315° relative to the U difference component of the chrominance which does not change phase from line to line. This is in contrast with the other sampling techniques that are accomplished along the U and V axes. As is also apparent from the vector diagram, the colors associated with the vector locations are also illustrated in the figure, with blue being approximately on the U axis, red being a few degrees from the V axis, yellow approximately on the (−U) axis and cyan approximately on the (−V) axis. The color bar representation of the fully saturated colors are shown in FIGS. 2 and 3. These color bars represent the maximum chroma amplitude for a 100% saturation level that can occur in a PAL video signal. The colors are shown adjacent a white level 10 which occurs after the horizontal sync pulse 12 and the several cycles of the burst component 14.

As is apparent from the vector diagram, the colors of red, yellow, blue and cyan are all within a few degrees of the respective U and V axes so that if sampling is taken along these axes, then the amplitude of the appropriate vector will be its maximum value and the analog-to-digital converter of the sampling means must use the entire range to obtain the amplitude of the signal. For example, if a fully saturated red color is sampled with a sampling means that samples along the U and V axes, then it will be comprised almost entirely of V component and be of maximum value. As is shown in FIG. 2 for the various colors, the dynamic range of the A-to-D converter that performs the sampling must extend from −32 IRE units for the red and blue colors to +132 for yellow and cyan. If an A-to-D converter has 256 levels which results when eight bits are used per sample, the dynamic range of the A-to-D converter must extend from −32 to +132. However, in accordance with the present invention, the sampling is accomplished along the (U+V) and (U−V) axes which are oriented at 45° relative to the U and V axes. Stated in other words, the (U+V) and (U−V) axes represent orthogonal axes that are oriented 45° relative to the orthogonal U and V axes. When sampling is performed along these axes, then the color yellow represents the vector addition of the vectors (U+V) and −(U−V), for example, and the color blue represents the vector addition of the (U+V) sample and the (U−V) sample. When such is done, the dynamic range for the A-to-D converter of the sampling means must only sample from the value of −26 to the value of +126 which represents approximately three db improvement with respect to chroma information, and 0.66 db improvement when the total signal having luminance and chrominance information is considered. Since the peak levels are smaller with the sampling being performed along the (U+V) and (U−V) axes, it is possible to have a sampling system with a greater dynamic range, i.e., the system can accommodate a signal having an increased level inasmuch as it would be able to handle a signal within the extended range of 126 to 132 and within the range of −26 to −32. Alternatively, if the dynamic range is reduced to accommodate the peak levels from −26 to +126, the A-to-D converter will have greater resolution. This is evident when it is considered that if the 256 levels of an eight bit system is spread out over −26 to +126 rather than −32 to +132, each level represents a proportionally smaller amount of the range and therefore is of greater resolution, i.e., each bit represents a lesser or smaller part of the video signal.

The sampling along the prescribed axes in accordance with the present invention results in a considerable improvement in the controlling of the accuracy of the sampling means itself. As is shown in FIG. 1, the burst component alternates on a line-by-line basis but is located on the (U+V) and (U−V) axes. As previously mentioned, it is the burst component which is used to control the phase of the clock that controls the actual sampling. This is done by sampling the burst, looking at those samples to determine the phase of the burst, determine any phase error and thereby adjusting the phase of the sampling clock to control the sampling clock phase to remove any phase error. When sampling is performed along the U and V axes, if everything is properly phased, the samples are taken through 45° relative to the burst and it is necessary to make the phase error determination from the amplitude of the samples. The resolution of the least significant bit of an eight bit sample at 45° of a sine wave is proportional to the tangent of the slope at 45° which is only 0.7 times the resolution of the least significant bit relative to the zero crossing points of the burst. Stated in other words, the tangent of the slope at 45° is only 0.7 times the tangent of the slope through 0°.

The significance of this aspect may be appreciated by the following example. If 1° of error at the zero crossing point of the burst is equivalent to the least significant bit, then 1° error at 45° while sampling at the 45° angle of burst means that it would not be within the least significant bit and therefore may represent a 1.4° error. While it may be possible to increase the accuracy of the phase of the sampling clock by utilizing a nine bit system, the addition of an extra bit involves a significant complication and expense. Also, while it is possible to rotate the phase of the burst through 45° merely for the purpose of controlling the phase of the sampling clock while not changing the location of the actual samples along the U and V axes, systems which perform such rotation must do the rotation in the analog domain before it reaches the digital-to-analog converter and such processes are not particularly effective and involve additional circuitry and are also to be avoided.

The increased accuracy of the phase of the sampling clock without manipulating the burst or requiring additional bits to increase the resolution of the system has the advantage of increasing the dynamic range of the sampling system as previously mentioned and permits simple, effective and efficient error concealment for dropout compensation to be performed on the resulting data stream. This can be readily seen from FIG. 4 which illustrates, by way of example, a raster display with six successive samples in each of three horizontal lines, i.e., line numbers 22, 23 and 24 (with the interlineated lines of the subsequent field, i.e., lines 335 and 336 being shown in phantom). Each of the samples shown in FIG. 4 is identified as having the luminance information (Y) together with the chrominance information which represents the location thereof at any one of the (U+V), −(U+V), (U−V) and −(U−V) locations. Also, the angle of the burst is identified adjacent the line number identification which shows that line 22 has burst oriented at −135°, line 23 being inverted at +135° and line 24 being at −135°. Thus, for any particular sample, for example, sample 16 in line 23, it can be replaced by the sample immediately above it from line 22, since that sample is taken at the identical location from the vector diagram of FIG. 1 from the preceding line. Since the sample 16 occurs at the same position along the horizontal line, it is spatially relatively accurate in that it is vertically spaced only one horizontal line from the sample 16 and is identically located along the horizontal line. Sample 20 which is adjacent to sample 16 and represents the next sample taken along line 23 is shown to be identical in terms of its vector position as the sample 22 located in line 24 which is the line succeeding line 23. The arrows 24 and 26 merely show the direction from which an identical sample is located and which may therefore be a substitute sample for a sample in line 23 which may be defective or missing. As described herein, a sample may be identified as a defective sample, but it should be understood that a defective sample may also comprise a missing sample, both instances of which represent erroneous digital information for which error concealment or dropout compensation should be applied. Only with the sample location structure that is accomplished by the present invention is an identical sample located above or below the sample of interest for replacement of a defective sample of interest.

With the error concealment technique shown in FIG. 4, it should be appreciated that if a single sample in line 23 is detected as being defective, the substitute value from the adjacent lines will represent one sample of a subcarrier cycle of which three other samples are correct. Therefore, the single replacement sample will be effectively averaged over four samples which is the resolving power of the system, i.e., the D-to-A converter so that the spatial position will be reasonably accurate. If part of or even an entire horizontal line of video information is lost, e.g. line 23, then equal amounts of replacement sample information will be taken from the preceding in time horizontal line 22 as well as the lower succeeding in time horizontal line 24 and the substitute information on line 23 will represent the average of the information from horizontal lines 22 and 24.

Since the sampling is done on the (U+V) and (U−V) axes and these axes are the same axes as the zero crossing of burst is evidenced from FIG. 1, the control of the sampling clock also controls the sampling that is done by the analog-to-digital converter. The circuitry that controls the phase of the sampling clock will now be described in connection with the block diagram of FIG. 7. As is shown therein, the digitized video data from the A-to-D converter is applied on line 30, which is actually eight lines of digital information and it is fed to a burst phase memory 32 as well as a second burst phase memory 34, both of which are 16×8 random access memories which operate to store 16 samples representing four samples from four consecutive cycles of the burst. The memories 32 and 34 are controlled by burst memory timing circuitry 36 via lines 38 and 40. The timing circuitry has a burst gate signal on input 42 as well as an analog burst signal on line 44, the latter of which effectively determines the first zero crossing in the positive direction which phases the write command to both memories. Also, the write command effectively writes in the four cycles of burst so that 16 samples are written to both of the memories. The write command on line 40 that extends to the burst memory 34 operates on every second horizontal line, i.e., on alternate lines, to refresh the data in the memory so that circuitry downstream of the memory 34 can perform an arithmetic determination of any burst error that may be present relative to the phase of the burst that is written in the burst memory 32. The memory 32 is operated to write in the 16 samples from four cycles of burst upon start-up of the recording apparatus for reference and rephase in the event that the phase error exceeds 30° which would occur in the event of a "wild switch" or the like. A "wild switch" is generally defined as the switching from one video signal to another where the phase relationship between the new video signal and what was previously present is drastically different, i.e., greater than 30° of burst phase difference. If there is no large change in the burst phase, then the burst store memory 32 will not be updated and minor phase adjustments that are necessary will be accomplished by phase shifting circuitry in connection with the circuitry downstream of the memory 34.

Returning to the first burst store memory 32, after the data has 16 samples written therein, the samples are repetitively read out and fed to a digital-to-analog converter 46 via line 48 that is clocked by a four times subcarrier clock on line 50 and provides an output on line 52 to a bandpass filter 54, the output of which contains the recycled burst at the subcarrier frequency of 4.43 MHz which appears on line 56 and is applied to a 360° active phase shifting circuit 58. The phase shifting circuitry normally operates to perform minor phase correction and this phase corrected signal is applied on line 60 where it is multiplied by four in a multiplier 62. Its output on line 64 is applied to another bandpass filter 66 which provides a four times subcarrier frequency signal on line 68 that is limited by limiter 70 to produce a square wave output on line 72 of 17.73 MHz. This signal is divided by four by a divider 74 to provide the 4.43 MHz clock signal on line 76 that extends to other circuitry in the recording and reproducing apparatus. The 17.73 MHz signal on line 72 also extends through switch 78 to provide the four times subcarrier square wave clock on line 80 that provides the sampling clock signal for the A-to-D converter. The A-to-D converter digitizes the analog video information signal including the burst component, which in digital form is applied to line 30. The switch 78 has a control line 42 that is controlled by a burst gate signal and during the presence of burst, it is switched to its lower position (not shown) whereby a 17.73 MHz signal on line 84 from a voltage controlled oscillator 86 provides the clock signal during the burst time. The voltage controlled oscillator 86 is synchronized to the input analog video information signal from line 128 and the signal on line 84 also controls the D-to-A converter 46. As previously mentioned, the digitized burst data from the analog-to-digital converter on line 30 is also applied to the second burst store memory 34 and is written in in real time as is necessary. The stored information which is updated on alternate horizontal lines is read out on lines 88 to a pair of parallel-to-serial converters 90 and 92. The parallel-to-serial converter 90 has output line 93 which provides a serial stream representing the odd samples, i.e., the samples $S_1, S_3 \ldots S_{15}$ as shown in FIG. 6 and these samples are processed by a serial summer and integrator circuit 94 which performs an arithmetic averaging of all odd numbered samples of the four subcarrier cycles of samples. The summation is performed in accordance with the expression below:

$$\Sigma = S_1 - S_3 + S_5 - S_7 + \ldots - S_{15}.$$

The resulting value represents an averaging of the error values and thereby represents the phase error at the maximum and minimum points of the sampled burst cycles which represent the cosine value of the error at those points. This value appears on line 96 that is applied to a serial-to-parallel converter 98 which is fed to a latch and digital-to-analog converter 100 via line 102 and it is this analog DC voltage that appears on line 104 that extends to provide one of the controls of the phase shifter 58.

The lower path of line 88 which is applied to the parallel-to-serial converter 92 which receives the even samples, i.e., $S_0, S_2, S_4, S_6 \ldots S_{14}$ and these samples are serialized and upper on line 106 to another serial summer and integrator circuit 108 which performs an averaging function for these values in accordance with the following expression:

$$\Sigma = S_0 - S_2 + S_4 - S_6 + \ldots - S_{14}.$$

The average value appears on line 110 that is fed to a serial-to-parallel converter 112 and the sine value of the phase error appears on line 114 to another latch to digital-to-analog converter 116 which has another DC voltage representing the sine of the error which appears on line 118 that also extends to control the phase shifter 58.

The cosine value from the line 118 provides the significant control of the phase shifter for those small errors that should be experienced during relatively normal operation of the apparatus, and in this regard, phase errors on the order of only a few degrees should normally be experienced during operation of the apparatus. In the event the phase of the video data changes dramatically, the error will be detected and will appear as a large error value on line 114 and this line also extends to a detector circuit 120 which provides an output signal on line 122 if the error is greater than 30°. The signal on line 122 is applied to the timing circuitry 36 which causes the line 38 to write in a new series of burst samples into the burst store memory 32. The line 122 also extends to the latch and digital-to-analog converters 100 and 116 which forces the output on line 118 to a one cosine value and the output on line 104 to a zero sine value which effectively forces a zero error condition on both of the lines which control the phase shifter 58.

The parallel-to-serial converters 90 and 92 are controlled by a pair of oppositely phased clocks so that when the 16 samples are applied at their inputs via line 88, the clocks effectively clock the odd samples into the circuit 90 and the even samples into circuit 92. These clocks are applied by a horizontal timing circuit 124 having output lines 126 which extend to the circuit 90, 92, 94, 108, 98, 112, 100 and 116. The horizontal timing circuitry also clocks an address counter which addresses the memory 34 during read operation. The phase shifter 58 is of conventional design and is of the type which comprises two balanced modulators whose outputs are summed together. The modulators are fed with sine waves of the recycled burst from filter 54 and one modulator is at zero degrees while the other is at 90°. The DC voltages on lines 104 and 118 control the AC gain of each of the modulators and the outputs are summed so that a four quadrant multiplying modulator operation is achieved, thereby providing a 360° active phase shifter which is controlled by the magnitudes of the DC voltages on the control lines 104 and 108.

Turning now to the error concealment apparatus of the present invention that accomplishes the error concealment shown in FIG. 4, reference is made to FIG. 5 which is a functional block diagram of circuitry which will perform the error concealment operation. As shown therein, the data is applied to input 130 which actually represents a data stream of eight bit data word samples plus a parity sample which will enable an error detector to determine whether a particular data word sample is defective or missing. The data is applied to a pair of latches 132 and 134 which are clocked by line 136 from a clock timing circuit 138 which has $4F_{sc}$ and $2F_{sc}$ input clocks and which generates clocks for controlling the clocking of the data through the various latches and also for controlling the timing of the read/write cycles in the memories and the like. The data is split into upper and lower paths and is operated upon by substantially similar circuitry in each of the paths. The division of the data into the two paths is performed to permit standard TTL circuitry to be able to accommodate the data rates that are employed herein, namely, the 17.7 MHz data stream on line 130. It should be apparent that if circuitry were used which would accommodate a 17.7 MHz data stream, then it would be unnecessary to split the data into the two paths shown in FIG. 5.

In the operation of the circuitry shown in FIG. 5, alternate samples are clocked into the upper and lower paths and the clock timing circuitry 138 effectively latches data alternately into latch 132 and 134. The output of latch 132 appears on line 140 which is the input of a second latch 142 which is needed to align the samples in the upper and lower paths so that the samples in the upper stream will not be staggered with respect to those in the lower path. Since the data is first latched into the upper latch 132, the second latch 142 delays the data in the upper path by one half clock period and thereby eliminates the need for two phases of 8.86 MHz clocks, two address counters for the memories and the like.

Since the upper path circuitry is substantially similar to the lower path circuitry, only the upper path circuitry will be described in detail. The output of latch 142 appears on line 144 which is applied to a tri-state latch 146 as well as another tri-state latch 148. The data on line 144 is essentialy that of horizontal line 24 and it is applied to a one line delay, indicated generally at 150, and comprises the tri-state latch 148, a random access memory 152, an input/output data bus 154, a tri-state latch 156 and output line 158. The data on line 158 is delayed one horizontal line with respect to the data on line 144 and therefore represents information from horizontal line 23. The line 158 is also applied to the input of another one line delay, indicated generally at 160, which comprises a tri-state latch 162, input/output data bus 164, tri-state latch 166 and random access memory 168 and its output appears on line 170 which is wire ORed to line 172 which in turn is wire ORed to line 158 and the output line 174 of tri-state latch 146. The data on line 170 is delayed one horizontal line with respect to the data on line 158 and therefore contains information from horizontal line 22. The tri-state latches 146, 156 and 166 are all capable of applying data onto their output lines and therefore onto line 172 which is connected to the input of yet another tri-state latch 176 which has output line 178 that is wire ORed to a similar line 178' to provide an ultimate output 80. The output line 178' is from a tri-state latch 176' that has input line 172' which is wire ORed to similar output lines 174', 158' and 170'. The tri-state latches 176 and 176' ae controlled by clock signals 180 and 180' which are oppositely phased clocks which alternate to provide output signals therefrom to reacquire the normal timing of the data from the two paths in the form that was provided at the input line 130.

Each of the one line delays 150 and 160 operates identically and comprise a random access memory which is addressed by an address counter 182 via lines 184. The address counter is clocked by a $2F_{sc}$ clock signal on line 186. Tri-state latches 148, 156, 162. 166 and 146 are similarly clocked by the clock timing circuitry via line 188 and this clock signal is a $2F_{sc}$ frequency signal. The memories 152 and 168 are addressed so that a full horizontal line of data words are contained in each of the memories to accomplish a one line delay. It should be appreciated that a shift register of comparable capacity could also be used rather than a random access memory, if desired. The read and write operations are controlled so that for a given address a read cycle occurs prior to a write cycle with each data word being appropriately controlled by proper operation of the tri-state latches 148, 156 and the memory 152. During a read operation, the tri-state latch 148 is tri-stated, the tri-state latch 156 is adapted to have a data word latched therein when the memory 152 places the word onto the bus 154. After the word has been latched in the latch 156, output of the latch 148 is enabled and puts the next word onto the bus 154 whereupon a write operation is accomplished in the memory and the word is thereby written into memory. After the word is written into memory, the address counter 182 increments the memory to perform a read operation. This cycle is repetitively performed as should be appreciated.

As should be apparent from the illustration of FIG. 4, any defective or missing samples will be compensated for when they are in the relative position of horizontal line 23. Therefore, the line 23 parity information is applied via line 187 which is the input of an error detector 189 of conventional design, which detects whether there is an error in the parity information and provides an output signal on line 190 when such occurs. Correction selector logic circuitry 192 then controls the appropriate substitution of a data sample from either horizontal line 22 or horizontal line 24 in the manner previously described. The correction selector logic 192 also has an input line 194 which is a line rate signal that is also applied to the address counter 182 to zero the counter when a new horizontal line of information is to be processed through the memories. The correction selection logic 192 has output lines 202 and 202' which extend to the tri-state latches 156, 166, 146 and those of the lower path circuitry to control which of these latches will apply data to their respective outputs and therefore onto the lines, 172' and eventually to the output line 200. When the data is present and not defective, tri-state latch 158 will be controlled to apply data onto line 158 as this is the line 23 data and contains the normally appearing data. In the event that the error detector 189 determines that a data word is defective, then the control line 202, which in actuality comprises two control lines, effectively tri-states the latch 156 and simultaneously controls either latch 146 or 166 to apply data onto the output and effectively substitute either the data word from horizontal line 22 or horizontal line 24 into the data stream. The logic 192 controls the signal on line 202 so that the data from latch 146 and 166 alternately appears on line 172 in accordance with the scheme shown in FIG. 4. Since the burst phase alternates every line, the signal on line 202 changes on a line-by-line rate so as to automatically switch the operation of the latches 146 and 166 so that the appropriate data word is applied to the line 172. It should be apparent that the correction selection logic 192 automatically controls the apparatus to insert the correct substitute data word whenever the error detector detects a defective sample. The three tri-state latches 146, 156 and 166 are thereby controlled so that either the data word of interest on horizontal line 23 is ultimately applied to the output 200 or one of the data words from either horizontal line 22 or 24 is applied thereto.

From the foregoing description, it should be appreciated that the present invention offers many advantages for performing error concealment for a PAL format video information. The sampling technique described herein results in a particular phase location of the samples relative to the chroma subcarrier which effects a simple, efficient, and effective error concealment of defective or missing samples.

While certain preferred embodiments of the present invention have been illustrated and described herein, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. Apparatus for providing substitute digital data samples in a stream of digital data samples taken from an analog video information signal having a PAL television format that has been digitally sampled at four times the frequency of a color subcarrier of the video signal at instants of 45°, 135°, 225° and 315° relative to the U chrominance component of said video information signal, said digital data stream having samples corresponding to horizontal line locations of a raster display of successive horizontal lines wherein said locations of each line are vertically aligned with said locations of the other lines, said apparatus comprising:

means for receiving data word samples from at least three successive horizontal video lines and for storing said video data samples from at least two of said horizontal video lines;

means for detecting a missing or defective sample in one of said video lines and for generating an indicating signal when a missing or defective sample is detected;

means, responsive to said indicating signal and operatively coupled to said receiving and storing means and to said detecting means, for inserting a substitute data sample into said one video line for said missing or defective data sample, said substitute data sample being selected from one of the samples of one of the preceding or succeeding horizontal lines relative to said one video line, said substitute data sample selected being vertically aligned and correspondingly phased relative to said missing or defective sample.

2. Apparatus as defined in claim 1 wherein said receiving and storing means comprises two delay means connected in series with one another, each of said delay means being adapted to provide a delay in the amount of one horizontal line of video information.

3. Apparatus as defined in claim 2 wherein each of said delay means comprises digital means having an input and an output wherein the digital data samples are clocked into the input and are clocked out of the output one horizontal line later.

4. Apparatus as defined in claim 3 wherein each of said delay means comprises a digital random access memory.

5. Apparatus as defined in claim 3 wherein each of said delay means comprises a digital shift register.

6. Apparatus for providing substitute digital samples in a data stream of digital samples taken from a video information signal having a PAL television format that has been digitally sampled at a frequency of four times the chroma subcarrier at locations that are 45°, 135°, 225° and 315° relative to the U chroma component of the video signal, said digital data stream having samples corresponding to horizontal line locations of a raster display of successive horizontal lines wherein said locations of each line are vertically aligned with said locations of the other lines, said apparatus comprising:

means for receiving said data word samples from at least three successive horizontal video lines and for storing said video word samples from at least two of said horizontal video lines so that video data samples from at least three successive horizontal video lines are simultaneously available;

means for examining said data samples and for detecting a defective sample in one of said video lines and for generating an indicating signal responsive to a defective sample being detected;

means, responsive to said indicating signal and operatively coupled to said receiving and storing means and to said detecting means, for inserting a digital sample into said one video line for said defective sample, said digital sample inserted being from a sample in one of the preceding or succeeding video lines relative to said one video line having the defective sample and being an identically phased sample which is vertically oriented relative to said defective sample.

7. Apparatus as defined in claim 6 wherein said inserting means is automatically adapted to alternately insert data samples from the preceding and succeeding lines on a sample by sample basis, said inserting means inserting the automatically selected samples in response to receiving said indicating signal.

* * * * *